United States Patent
Yanagi

(10) Patent No.: US 8,885,045 B2
(45) Date of Patent: Nov. 11, 2014

(54) DEVICE AND METHOD FOR MONITORING VEHICLE SURROUNDINGS

(75) Inventor: Takura Yanagi, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1269 days.

(21) Appl. No.: 11/997,515

(22) PCT Filed: Jul. 31, 2006

(86) PCT No.: PCT/JP2006/315114
§ 371 (c)(1),
(2), (4) Date: Jan. 31, 2008

(87) PCT Pub. No.: WO2007/015446
PCT Pub. Date: Feb. 8, 2007

(65) Prior Publication Data
US 2010/0220189 A1 Sep. 2, 2010

(30) Foreign Application Priority Data
Aug. 2, 2005 (JP) ................................. 2005-224489

(51) Int. Cl.
H04N 7/18 (2006.01)
B60R 1/00 (2006.01)
B60R 11/04 (2006.01)
B60R 19/48 (2006.01)

(52) U.S. Cl.
CPC ............. B60R 1/00 (2013.01); B60R 2300/806 (2013.01); B60R 2300/607 (2013.01); B60R 2300/301 (2013.01); B60R 2300/105 (2013.01); B60R 2300/8093 (2013.01); B60R 2300/102 (2013.01); B60R 11/04 (2013.01); B60R 2300/70 (2013.01); B60R 2300/305 (2013.01); B60R 19/483 (2013.01)
USPC ............ 348/148; 348/147; 348/152; 348/153

(58) Field of Classification Search
USPC .................................. 348/147, 148, 152, 153
See application file for complete search history.

(56) References Cited

U.S. PATENT DOCUMENTS

| 4,270,808 A | 6/1981 | Brearley | |
| 5,964,810 A * | 10/1999 | Hirano et al. | 701/28 |

(Continued)

FOREIGN PATENT DOCUMENTS

| EP | 1 065 642 A1 | 1/2001 |
| EP | 1 168 248 A2 | 1/2002 |

(Continued)

OTHER PUBLICATIONS

A. Kanaoka et al., U.S. PTO Final Office Action, U.S. Appl. No. 11/822,352, dated Aug. 9, 2010, 22 pgs.

(Continued)

Primary Examiner — Thanh Tammy Nguyen
Assistant Examiner — Jonathan Bui
(74) Attorney, Agent, or Firm — Foley & Lardner LLP

(57) ABSTRACT

A vehicle surrounding monitoring device include at least one camera 2 installed in an own vehicle to image a video around the own vehicle, an obstacle sensor 3 for detecting an obstacle within an imaging range of the camera 2, a pixel synthesis unit 13 for receiving a camera image imaged by the camera 2 and converting the camera image into a view point converted image seen from a virtual view point above the own vehicle, and a display device 4 for displaying the view point conversion image converted by the pixel synthesis unit 13. Simultaneously when a warning is given by a warning sound upon entry of an obstacle within an obstacle detection range of the obstacle sensor 3, an image of the obstacle detection range is synthesized with an obstacle image imaged by the camera 2 and included in the view point converted image to be in contact therewith.

10 Claims, 11 Drawing Sheets

(56) References Cited

U.S. PATENT DOCUMENTS

| | | | |
|---|---|---|---|
| 6,335,754 B1 | 1/2002 | Endo et al. | |
| 6,912,001 B2 | 6/2005 | Okamoto et al. | |
| 6,947,611 B2 * | 9/2005 | Kawakami et al. | 382/293 |
| 6,958,770 B2 | 10/2005 | Okada et al. | |
| 6,970,184 B2 * | 11/2005 | Hirama et al. | 348/148 |
| 7,058,207 B2 | 6/2006 | Iida et al. | |
| 7,132,933 B2 * | 11/2006 | Nakai et al. | 340/435 |
| 7,139,412 B2 * | 11/2006 | Kato et al. | 382/104 |
| 7,161,616 B1 | 1/2007 | Okamoto et al. | |
| 7,277,123 B1 * | 10/2007 | Okamoto et al. | 348/148 |
| 7,298,247 B2 * | 11/2007 | Shimizu | 340/435 |
| 7,317,813 B2 * | 1/2008 | Yanagawa et al. | 382/104 |
| 7,343,026 B2 | 3/2008 | Niwa et al. | |
| 7,369,041 B2 * | 5/2008 | Nakanishi et al. | 340/435 |
| 7,370,983 B2 | 5/2008 | DeWind et al. | |
| 7,379,813 B2 | 5/2008 | Kubota et al. | |
| 7,486,801 B2 * | 2/2009 | Suzuki et al. | 382/103 |
| 7,519,922 B2 | 4/2009 | Obradovich | |
| 7,554,573 B2 * | 6/2009 | Mizusawa | 348/115 |
| 7,881,496 B2 * | 2/2011 | Camilleri et al. | 382/104 |
| 2002/0110262 A1 | 8/2002 | Iida et al. | |
| 2002/0175999 A1 * | 11/2002 | Mutobe et al. | 348/148 |
| 2002/0181803 A1 * | 12/2002 | Kawakami et al. | 382/293 |
| 2002/0191078 A1 * | 12/2002 | Okamoto et al. | 348/148 |
| 2003/0076414 A1 | 4/2003 | Sato et al. | |
| 2003/0076415 A1 * | 4/2003 | Strumolo | 348/149 |
| 2003/0085999 A1 * | 5/2003 | Okamoto et al. | 348/148 |
| 2003/0165255 A1 * | 9/2003 | Yanagawa et al. | 382/104 |
| 2003/0179293 A1 * | 9/2003 | Oizumi | 348/148 |
| 2004/0016870 A1 * | 1/2004 | Pawlicki et al. | 250/208.1 |
| 2004/0056950 A1 | 3/2004 | Takeda | |
| 2004/0184638 A1 | 9/2004 | Nobori et al. | |
| 2005/0075770 A1 * | 4/2005 | Taylor et al. | 701/36 |
| 2005/0196034 A1 * | 9/2005 | Hattori et al. | 382/154 |
| 2005/0231341 A1 * | 10/2005 | Shimizu | 340/436 |
| 2006/0038895 A1 * | 2/2006 | Suzuki et al. | 348/222.1 |
| 2006/0070795 A1 | 4/2006 | Meissner | |
| 2006/0125919 A1 * | 6/2006 | Camilleri et al. | 348/148 |
| 2006/0181399 A1 | 8/2006 | Sumiya | |
| 2006/0192660 A1 * | 8/2006 | Watanabe et al. | 340/435 |
| 2008/0224841 A1 | 9/2008 | Lundgren et al. | |
| 2008/0309518 A1 | 12/2008 | Aung | |
| 2009/0121651 A1 | 5/2009 | Gandhi | |
| 2009/0132162 A1 * | 5/2009 | Kudoh et al. | 701/201 |
| 2012/0154592 A1 | 6/2012 | Mizuta | |

FOREIGN PATENT DOCUMENTS

| | | |
|---|---|---|
| EP | 1 179 958 A1 | 2/2002 |
| EP | 1 197 937 A1 | 4/2002 |
| EP | 1 231 110 A2 | 8/2002 |
| EP | 1 303 140 A1 | 4/2003 |
| EP | 1 407 931 A1 | 4/2004 |
| JP | 2001-224013 A | 8/2001 |
| JP | 2001-315603 A | 11/2001 |
| JP | 2002-125224 A | 4/2002 |
| JP | 2002-199257 A | 7/2002 |
| JP | 2002-314991 A | 10/2002 |
| JP | 2003-067735 | 3/2003 |
| JP | 2003-067735 A | 3/2003 |
| JP | 2003-132349 A | 5/2003 |
| JP | 2003-169323 A | 6/2003 |
| JP | 2004-026012 A | 1/2004 |
| JP | 2004-240480 A | 8/2004 |
| JP | 2004-274114 A | 9/2004 |
| JP | 2004-354326 A | 12/2004 |
| WO | WO-03/107067 A2 | 12/2003 |

OTHER PUBLICATIONS

Shi-Xue Lu et al., "Real-time Detecting and Warning System of Lightning in Guangxi", Journal of Guangxi Meteorology, vol. 24, No. 2 (2003), pp. 46-48.

Satoshi Chinomi, U.S. PTO Office Action, U.S. Appl. No. 11/256,533, dated Nov. 12, 2008, 15 pgs.

Satoshi Chinomi, U.S. PTO Office Action, U.S. Appl. No. 11/256,533, dated May 14, 2009, 15 pgs.

Satoshi Chinomi, U.S. PTO Notice of Allowance, U.S. Appl. No. 11/256,533, dated Oct. 30, 2009, 7 pgs.

U.S. Appl. No. 11/256,533, filed Oct. 24, 2005, Chinomi.

U.S. Appl. No. 11/822,352, filed Jul. 5, 2007, Kanaoka et al.

U.S. Appl. No. 12/354,201, filed Jan. 15, 2009, Kanaoka et al.

A. Kanaoka et al., U.S. PTO Final Office Action, U.S. Appl. No. 12/354,201 dated Aug. 7, 2012, (23 pgs).

A. Kanaoka et al., U.S. PTO Non-Final Office Action, U.S. Appl. No. 12/354,201 dated Mar. 28, 2012, 39 pgs.

A. Kanaoka et al., U.S. PTO Non-Final Office Action, U.S. Appl. No. 12/354,201 dated Feb. 27, 2013, (24 pgs).

A. Kanaoka et al., U.S. PTO Final Office Action, U.S. Appl. No. 12/354,201 dated Oct. 22, 2013, (15 pgs).

USPTO Office Action, U.S. Appl. No. 12/354,201, Jul. 18, 2014, 15 pages.

* cited by examiner (a)

(b)

DEVICE AND METHOD FOR MONITORING VEHICLE SURROUNDINGS

TECHNICAL FIELD

The present invention relates to a device and a method for monitoring vehicle surroundings, which enable a driver to recognize obstacles or the like present around a vehicle.

BACKGROUND ART

There has conventionally been known a driving support system which enables a driver to recognize a possibility of contact with an obstacle or a pedestrian during low-speed traveling such as moving-back or parking by monitoring the surroundings of his own vehicle through a camera to easily check dead angles of the vehicle surroundings which cannot be directly checked visually.

For this driving support system, various technologies have been proposed. An example is a rear-view camera device which arranges a camera in a car body rear part such as a rear trunk part, and displays a camera video imaged by the camera with a vehicle rear part set as an imaging direction on a display monitor of a dashboard to be viewed by the driver. Regarding this rear-view camera device, there has been available a type which overlay-displays a predicted track in a camera video according to steering angles of own vehicle front wheels so that a positional relation between a traveling direction of the own vehicle and an obstacle can be easily determined by the camera video. Conventionally, in addition to the system for visually supporting driving by displaying the camera video, there has been known a system which uses an ultrasonic sensor or the like for detecting an obstacle present around a vehicle by reflection of an ultrasonic wave to give a warning about presence of the obstacle, a positional relation between the own vehicle and the obstacle, or a distance from the own vehicle through a warning sound or a light emitted from a light emitting diode (LED).

Recently, as disclosed in Japanese Patent Application Laid-Open No. 2001-315603, a device has been proposed which uses an image synthesis technology to display a bird's-eye image looking down on an own vehicle from a virtual camera above the own vehicle, and displays a virtual object in a detection range of an obstacle detection sensor, a safe area having no obstacle according to a distance to an obstacle, or a road surface boundary of the object in this bird's-eye image. In Japanese Patent Application Laid-Open No. 2001-315603, a warning sound is issued when the obstacle is detected by the obstacle detection sensor.

However, as described above, when the bird's-eye image is displayed by combining the detection range of the obstacle detection sensor with the bird's-eye image, and the warning is simultaneously given, if the obstacle detected by the obstacle detection sensor is present in space away from a ground surface, irrespective of actual presence of the obstacle within the detection range of the obstacle detection sensor, the obstacle is displayed in a manner of not being present within the detection range of the obstacle detection sensor in the bird's-eye image, giving uncomfortable feelings.

The present invention has been proposed with the aforementioned situation in mind, and objects of the invention are to provide a device and a method for monitoring vehicle surroundings, which display, when an obstacle detection range is displayed in a view point converted image, the obstacle detection range without giving any uncomfortable feelings in a positional relation between the obstacle detection range and an obstacle.

DISCLOSURE OF THE INVENTION

A vehicle surrounding monitoring device of the present invention includes at least one camera installed in an own vehicle to image a video around the own vehicle, obstacle detection means installed in the own vehicle to detect an obstacle in an obstacle detection area, image processing means for converting a camera image imaged by the camera into a view point converted image seen from a virtual view point above the own vehicle, and display means for displaying the view point conversion image converted by the image processing means. To solve the aforementioned problem, a warning is given by a warning sound upon entry of an obstacle within an obstacle detection range of the obstacle detection means, and simultaneously the image processing means combines an image of the obstacle detection range of the obstacle detection means with an obstacle image which is imaged by the camera and included in the view point converted image so that the both images are to be in contact.

A vehicle surrounding monitoring method according to the present invention includes imaging a video around an own vehicle by a camera installed in the own vehicle, detecting an obstacle within an imaging range of the camera, and to solve the aforementioned problem, when presence of an obstacle is detected, giving a warning by a warning sound upon entry of the obstacle within an obstacle detection range of obstacle detection means, and simultaneously synthesizing an image of the obstacle detection range of the obstacle detection means to be in contact with an obstacle imaged by the camera and included in a view point converted image.

BEST MODE FOR CARRYING OUT THE INVENTION

Below, the embodiments of the present invention will be described with reference to the drawings.

Figure 1:
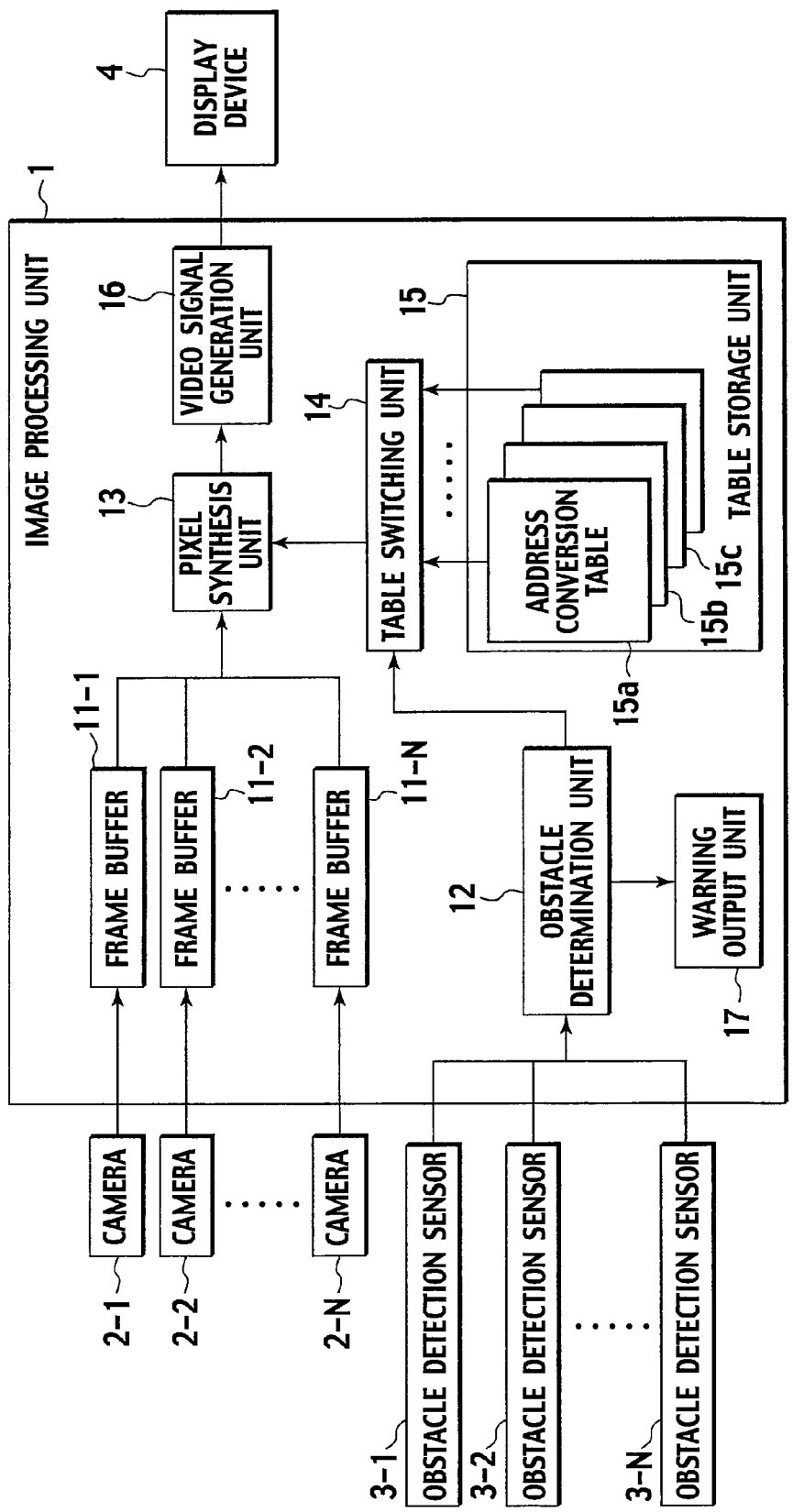
FIG. 1 is a block diagram showing a configuration of a vehicle surrounding monitoring device to which the present invention is applied.

The present invention is applied to a vehicle surrounding monitoring device configured, for example, as shown in FIG. 1. In the vehicle surrounding monitoring device, at least one or more cameras 2-1, 2-2, . . . , 2-N (simply referred to as "camera 2" generically hereinafter), a plurality of obstacle detection sensors (obstacle detection means) 3-1, 3-2, . . . , 3-N (simply referred to as "obstacle sensor 3" generically hereinafter), and a display device 4 are connected to an image processing unit (image processing means) 1. The cameras 2-1, 2-2, . . . , 2-N are arranged in different positions of an own vehicle, and imaging directions are different from one another. As in the case of the camera 2, the obstacle sensors 3-1, 3-2, . . . , 3-3 are arranged in different positions of the own vehicle, and obstacle detection ranges are different from one another.

Figure 2:
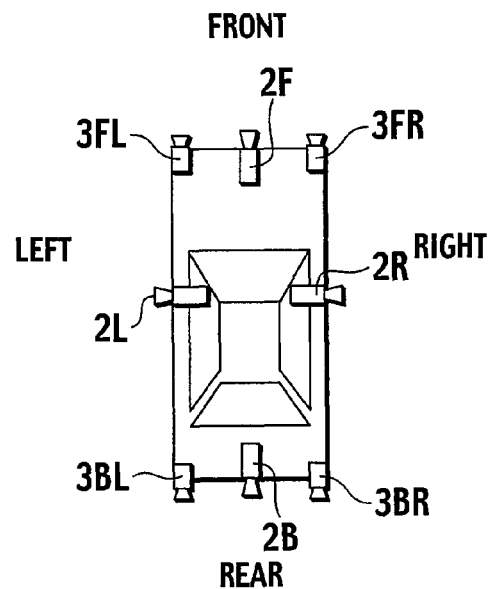
FIG. 2 is a top view showing arrangement positions of a camera and an obstacle sensor fixed to an own vehicle.
Figure 3:
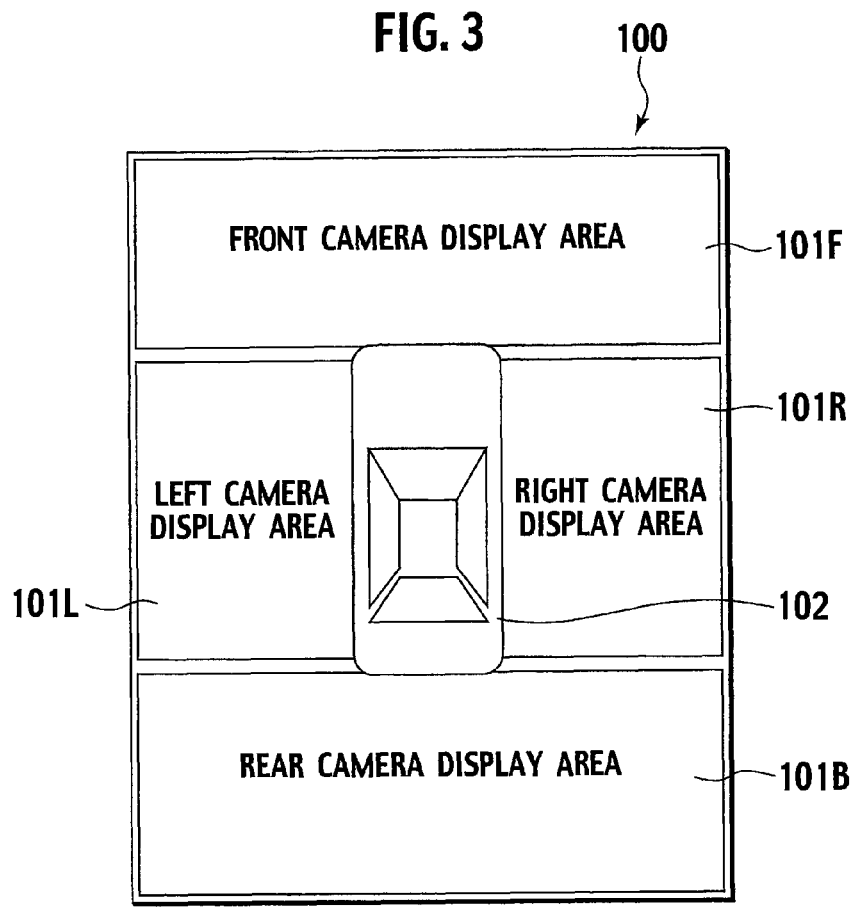
FIG. 3 is a diagram showing a bird's-eye image formed by an image processing unit.

Specifically, as shown in FIG. 2, the cameras 2-1, 2-2, . . . , 2-N are, for example, super-wide-angle cameras where horizontal field angles are 180°, and include four cameras, i.e., a camera 2F for imaging a front side of the vehicle, a camera 2B for imaging a rear side, a camera 2R for imaging a right side, and a camera 2L for imaging a left side. Accordingly, the cameras 2F, 2B, 2R, and 2L include, by the image processing unit 1 described below, as in the case of a bird's-eye image (view point converted image) 100 subjected to image synthesis processing (view point conversion processing) to be displayed by the display unit 4 shown in FIG. 3, a front camera display area 101F, a rear camera display area 101B, a right camera display area 101R, and a left camera display area 101L, and can form images for understanding all the surroundings of the own vehicle.

The bird's-eye image 100 is an image subjected to view point conversion processing as if to look down the own vehicle from above by using camera image data imaged by the cameras 2F, 2B, 2R, and 2L shown in FIG. 2. An image drawn roughly in the center of the bird's-eye image is an own vehicle overlay image 102 having a size corresponding to a floor area of the own vehicle stored beforehand in an overlay image storage unit which is not shown. Black beltlike partition lines are arranged between the display areas of the bird's-eye image 100. Note that each display area can be allocated differently from the example according to an actual imaging area.

For the obstacle sensors 3-1, 3-2, . . . , 3-3, ranges (obstacle detection ranges) provided with widths of angle of about 90° to 140° from installation positions in fan shapes to detect obstacles present in a distance of about 1 m from the own vehicle are set. As shown in FIG. 2, the obstacle sensors 3-1, 3-2, . . . , 3-3 include four obstacle sensors, i.e., an obstacle sensor 3FR for detecting obstacles of front right direction, an obstacle sensor 3FL for detecting obstacles of front left direction, an obstacle sensor 3BR for detecting obstacles of rear right direction, and an obstacle sensor 3BL for detecting obstacles of rear left direction. These obstacle sensors 3FR, 3FL, 3BR, and 3BL are configured so that in FIG. 3, obstacles present in a front camera display area 101F can be detected by the obstacle sensors 3FR and 3FL, obstacles present in a rear camera display area 101B can be detected by the obstacle sensors 3BR and 3BL, obstacles present in a right camera display area 101R can be detected by the obstacle sensors 3FR and 3BR, and obstacles present in a left camera display area 101L can be detected by the obstacle sensors 3FL and 3BL.

As shown in FIG. 2, a case where the cameras 2-1, 2-2, . . . , 2-N consist of cameras 2F, 2B, 2R, and 2L respectively, and the obstacle sensors 3-1, 3-2, . . . , 3-3 consist of obstacle sensors 3FR, 3FL, 3BR, and 3BL respectively will be described below.

As shown in FIG. 1, the image processing unit 1 enters camera image data of the vehicle surroundings imaged by the cameras 2F, 2B, 2R, and 2L to frame buffers 11-1, 11-2, . . . , 11-N (simply referred to as "frame buffer 11" generically hereinafter) which are input buffers corresponding to the cameras 2F, 2B, 2R, and 2L to temporarily store the data. A plurality of camera image data stored in the frame buffer 11 are used for forming a bird's-eye image 100 by image synthesis processing of a pixel synthesis unit 13.

The image processing unit 1 enters sensor signals from the obstacle sensors 3FR, 3FL, 3BR, and 3BL to a single obstacle determination unit 12. The obstacle determination unit 12 calculates presence of an obstacle around the own vehicle, and a position and a distance when an obstacle is present based on each entered sensor signal. The obstacle determination unit 12 outputs the calculated presence of the obstacle, and the calculated position and distance of the obstacle to a table switching unit 14.

The table switching unit 14 switches a table (address conversion table) to be referred to in the image synthesis processing of the pixel synthesis unit 13 to one of a plurality of address conversion tables among the plurality of address conversion tables stored in a table storage unit 15.

In the address conversion table stored in the table storage unit 15, correspondence relationship between each pixel of the bird's-eye image 100 which is an output image output to the display device 4 and information for specifying image data to be stored in the pixel is described. Specifically, in the address conversion table, whether to store camera image data in each pixel of the bird's-eye image 100 which is the output image, whether to store an overlay image indicating the own vehicle or the obstacle, which of addresses in which of the frame buffers 11 image data is taken out from when the camera image data is stored, and which of pieces of color information is stored when the overlay image is stored are described. In other words, in the address conversion table, contents of image synthesis processing for which of the frame buffers or overlay image storage units not shown the camera image to form the bird's-eye image 100 is taken out from, and which of the address in the output buffer of a video signal generation unit 16 the taken-out camera image data or the overlay image is stored are described.

The pixel synthesis unit 13 refers to the address conversion table selected by the video signal generation unit 16 to take out the camera image data stored in the frame buffer 11 or the overlay image indicating the own vehicle or the obstacle, and stores the image in the output buffer of the video signal generation unit 16. Accordingly, the pixel synthesis unit 13 stores the bird's-eye image 100 obtained by synthesizing the plurality of camera image data imaged by the cameras 2F, 2B, 2R, and 2L in the video signal generation unit 16.

Upon storage of the bird's-eye image 100 of one frame in the output buffer by the pixel synthesis unit 13, the video signal generation unit 16 outputs the bird's-eye image 100 to the display device 4 to display the image therein. Output timing of the bird's-eye image 100 from the output buffer of the video signal generation unit 16 to the display device 4 has been preset in advance together with timing of the image synthesis processing of the pixel synthesis unit 13.

A warning output unit 17 for outputting, when presence of an obstacle within the obstacle detection range of the obstacle sensor 3 is detected by the obstacle determination unit 12, a warning sound indicating the detection is connected to the obstacle determination unit 12. This warning output unit 17 includes a speaker for outputting a predetermined warning sound to the driver.

Next, a specific example where the vehicle surrounding monitoring device configured in the aforementioned manner causes the display device 4 to display the bird's-eye image 100 will be described.

Figure 4:
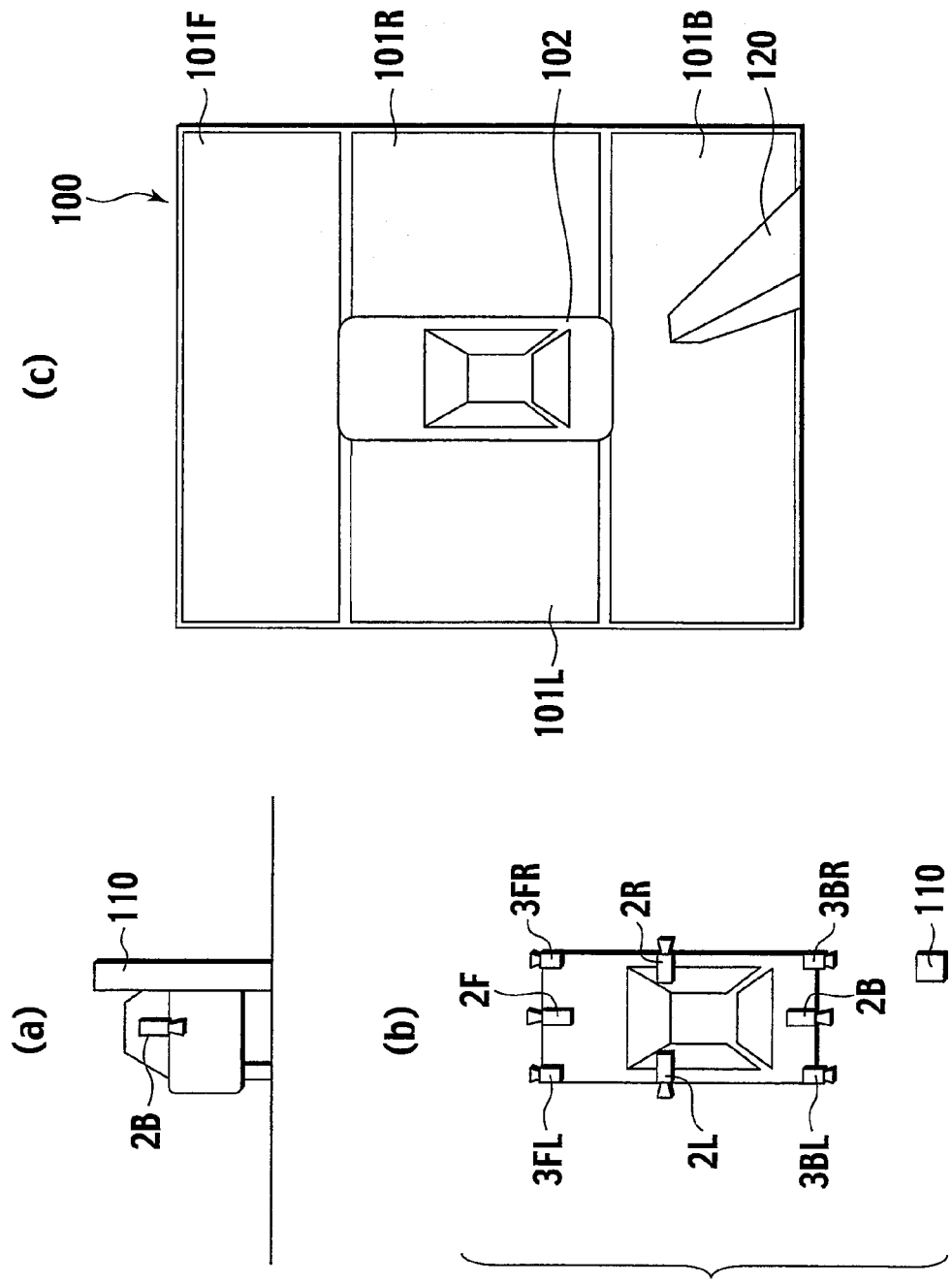
FIGS. 4A to 4C are respectively a back diagram of the own vehicle, a top diagram of the own vehicle, and a bird's-eye image diagram showing a bird's-eye image when a pole is present in a right rear side of the own vehicle.
Figure 5:
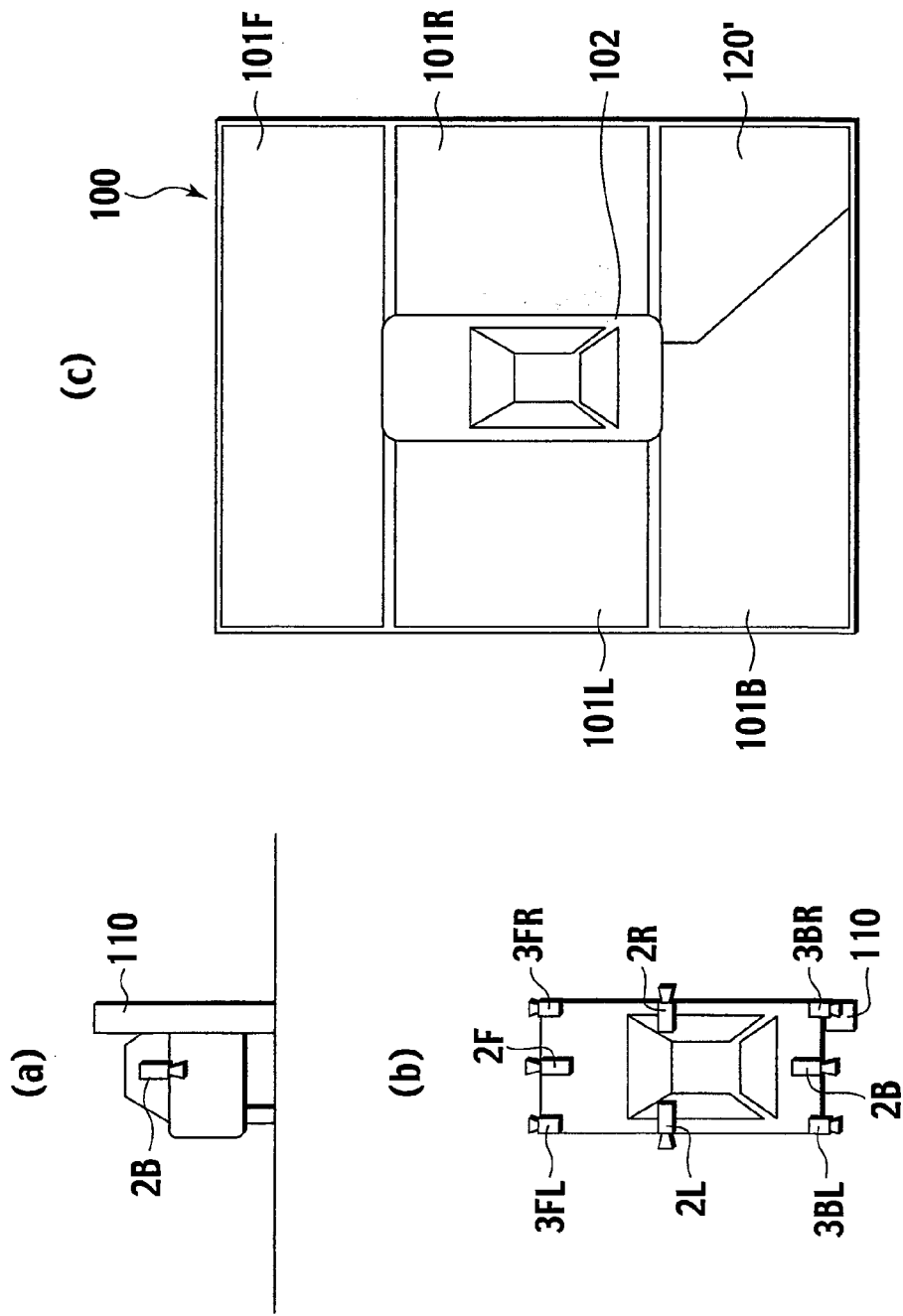
FIGS. 5A to 5C are respectively back diagram of the own vehicle, a top diagram of the own vehicle, and a bird's-eye image diagram showing an explanation about another bird's-eye image when the own vehicle approaches the pole.

For example, as shown in FIGS. 4A and 4B, when a pole 110 is present as an obstacle in a rear right side of the own vehicle, the bird's-eye image 100 includes, as shown in FIG. 4C, an obstacle image 120 in the rear camera display area 101B below a right side of the own vehicle overlay image 102. As in the case of the pole 110, when the obstacle stands vertically in contact with the ground surface, in the bird's-eye image 100, a contact surface between the pole 110 and the ground surface can be displayed in a correct position with respect to the own vehicle. When the vehicle is moved back straight in a state of FIG. 4A, as shown in FIGS. 5A and 5B, contact of the own vehicle with the pole 110 can be understood. Additionally, as shown in FIG. 5C, the image processing unit 1 forms an obstacle image 120' where the pole 110 of the rear camera display area 101B is displayed to be distorted so that the obstacle image 120' can be displayed in contact with the own vehicle overlay image 102.

As shown in FIGS. 6A to 6C and FIGS. 7A to 7C, when the other vehicle 130 stopped in the position of the pole 110 is present in FIGS. 4A to 4C and FIGS. 5A to 5C, an obstacle present in a position closest to the own vehicle is a bumper of the other vehicle 130, and present at a predetermined height from the ground surface different from the pole 110.

Figure 6:
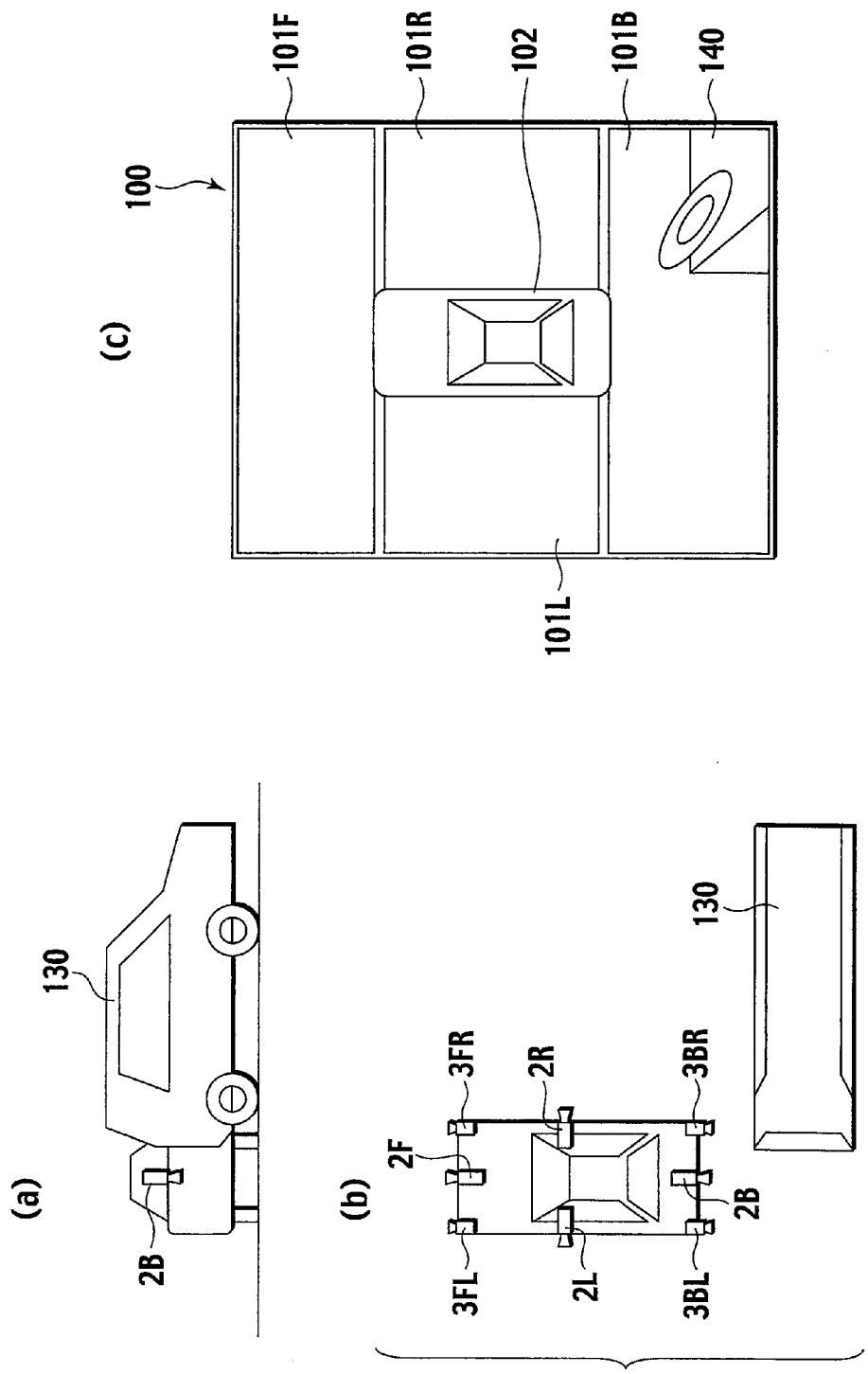
FIGS. 6A to 6C are respectively a back diagram of the own vehicle, a top diagram of the own vehicle, and a bird's-eye image diagram showing an explanation about a bird's-eye image when another vehicle is present in the right rear side of the own vehicle.
Figure 7:
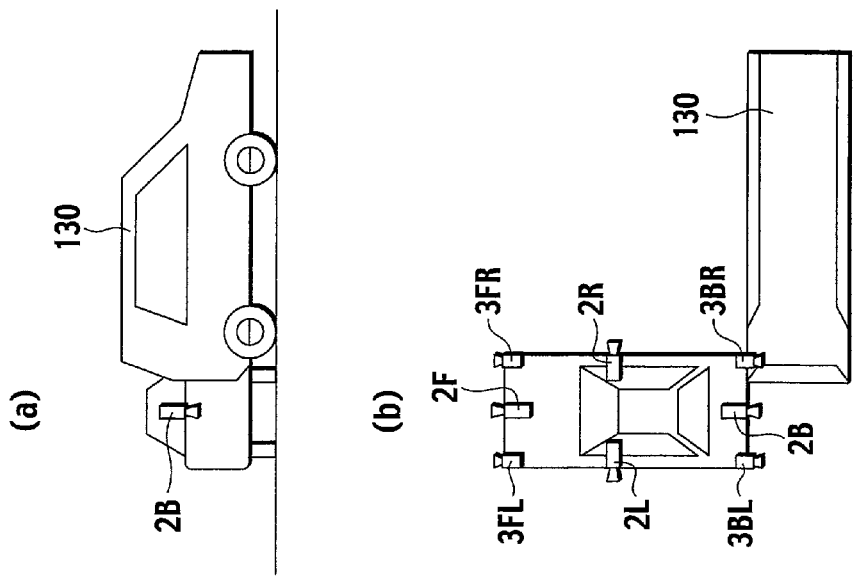
FIGS. 7A to 7C are respectively a back diagram of the own vehicle, a top diagram of the own vehicle, and a bird's-eye image diagram showing an explanation about a bird's-eye image when the own vehicle approaches the other vehicle.

When the obstacle is present above the ground surface as in the aforementioned case, depending on a positional relation with attaching heights of the cameras 2F, 2B, 2R, and 2L, a phenomenon of positional shifting, i.e., shifting of a positional relation between the own vehicle and the other vehicle 130 in the bird's-eye image 100, occurs. In other words, as shown in FIGS. 6A and 6B, when the own vehicle is moved back straight, irrespective of a positional relation of potential contact with the other vehicle 130, as shown in FIG. 6C, there is a possibility of forming a bird's-eye image 100 where the own vehicle is not in contact with the other vehicle 130. Even when a stage is changed from the state of FIGS. 6A and 6B, by straight movement-back of the own vehicle, to a state where the own vehicle is actually brought into contact with the other vehicle 130 as shown in FIGS. 7A and 7B, there is a possibility of forming a bird's-eye image 100 which includes an other vehicle image 140' which is not in contact as shown in FIG. 7C.

Figure 8:
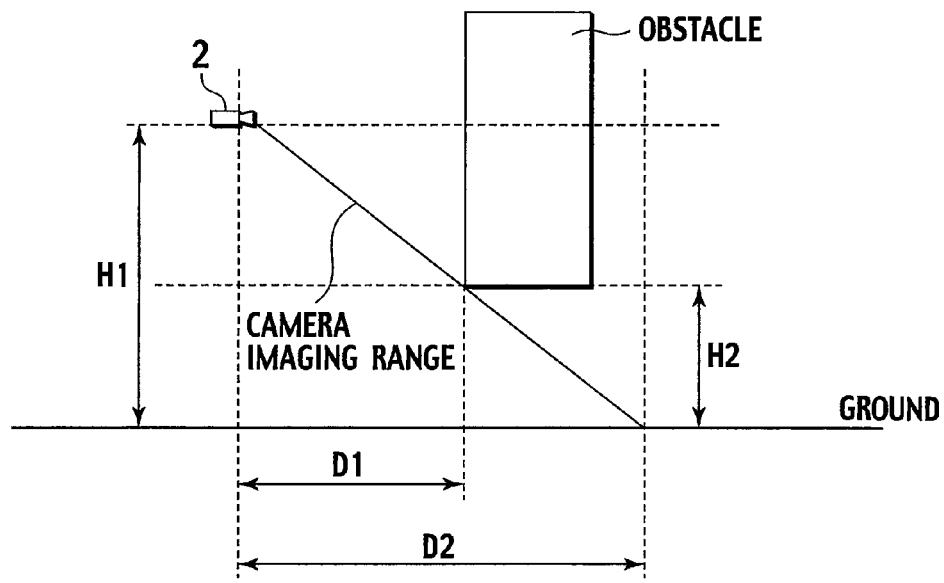
FIG. 8 is a diagram showing a cause of positional shifting of an obstacle in the bird's-eye image.

The phenomenon of the shifting of the positional relation between the own vehicle and the other vehicle 130 in the bird's-eye image 100 is caused, as shown in FIG. 8, by a principle of generating a bird's-eye image 100 itself where depending on a relation between a ground height H1 of the camera 2 and a ground height H2 of the obstacle, as for the obstacle above the ground, a distance from the camera 2 to the obstacle is imaged as if the obstacle is present in a position more away from the camera 2 than that in an actual case. In other words, in reality, irrespective of only a distance D1 from the camera 2 to the obstacle, the obstacle is imaged at a distance D2 within a camera imaging range, and thus the bird's-eye image 100 includes the obstacle in the position of the distance D2 greater than the distance D1.

Figure 9:
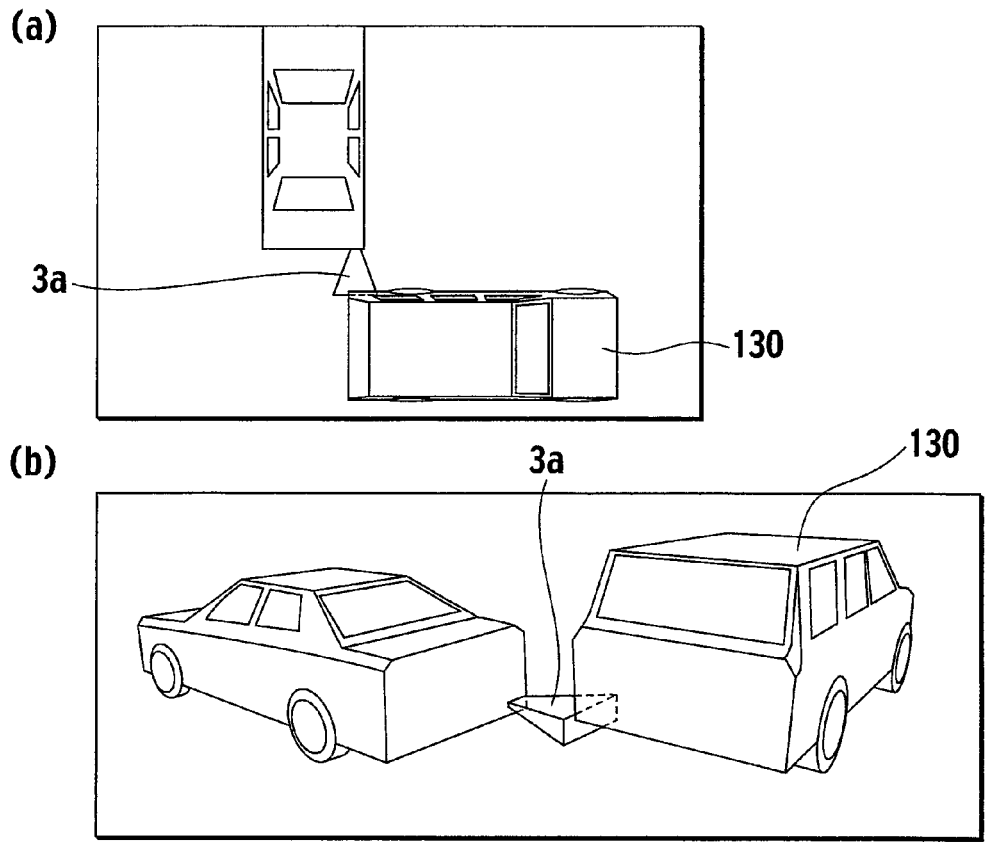
FIGS. 9A and 9B are respectively a top diagram showing an actual state where the other vehicle is present within an obstacle detection range of the obstacle detection sensor of the own vehicle, and a perspective diagram showing the actual state where the other vehicle is present within the obstacle detection range of the obstacle detection sensor of the own vehicle.

More specifically, a case where the other vehicle 130 is actually present as an obstacle within an obstacle detection range 3a of the obstacle sensor 3BR as shown in a diagram of FIG. 9A where the own vehicle is seen from above and a diagram of FIG. 9B where the own vehicle is seen from an oblique rear side will be considered. In this case, when an installation position of the camera 2 is higher than an installation position of the obstacle sensor 3, the obstacle detection range 3a imaged by the camera 2 includes, as shown in FIG. 10, not only an area 3b where the obstacle detection range 3a is projected on the ground surface but also an area 3c of a range passed from the installation position of the camera 2 through an end of the obstacle detection range 3a and projected on the ground surface.

Figure 11:
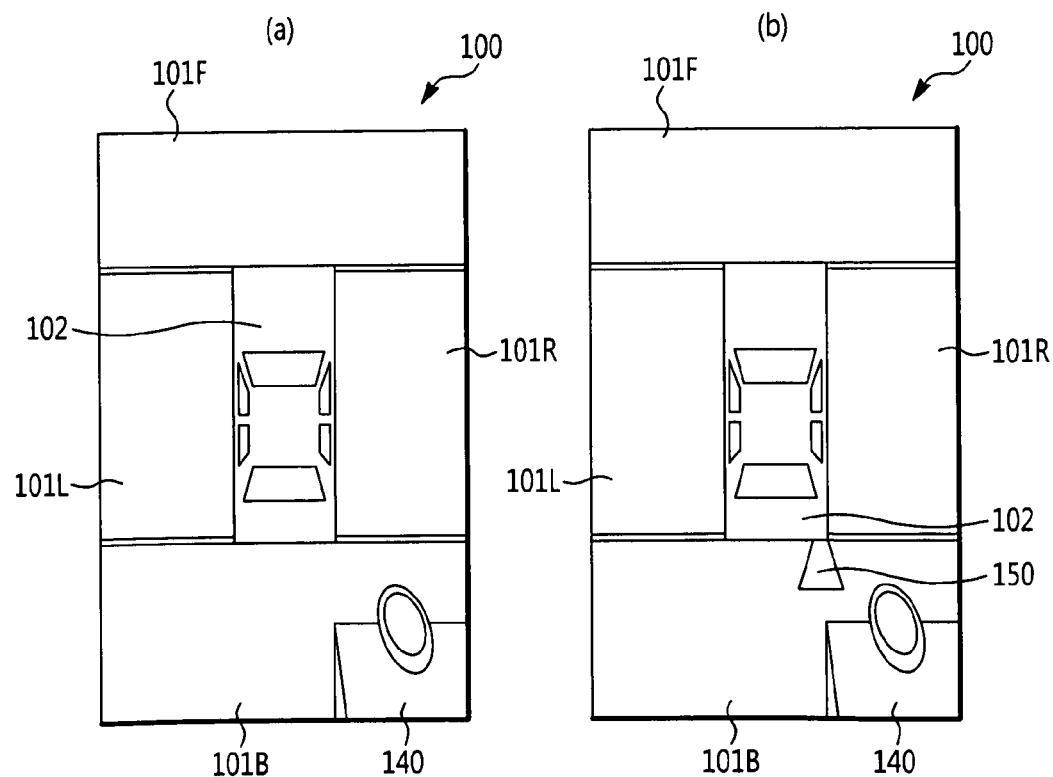
FIGS. 11A and 11B are respectively a diagram showing a bird's-eye image when no other vehicle is present within the obstacle detection range of the own vehicle, and a diagram showing a bird's-eye image where the other vehicle is not in contact with the obstacle detection range of the own vehicle even if the other vehicle is present within the obstacle detection range of the own vehicle.

Accordingly, in reality, even if the other vehicle 130 is present within the obstacle detection range 3a, even when an obstacle detection range image 150 indicating the area 3b where the obstacle detection range 3a is projected vertically on the ground surface is synthesized with the bird's-eye image 100 shown in FIG. 11A, as shown in FIG. 11B, in a bird's-eye image 100 imaged by the camera 2 and subjected to view point conversion, contact of an other vehicle image 140 within the obstacle detection range 3a cannot be presented.

On the other hand, in the case of the vehicle surrounding monitoring device to which the present invention is applied, when an obstacle enters the obstacle detection range 3a of the obstacle sensor 3, a warning sound is output from the warning output unit 17, an image of the obstacle detection range 3a of the obstacle sensor 3 is simultaneously synthesized with an image of an obstacle imaged by the camera 2 and included in the bird's-eye image 100 to be contact therewith, and the bird's-eye image 100 is displayed by the display device 4.

Figure 10:
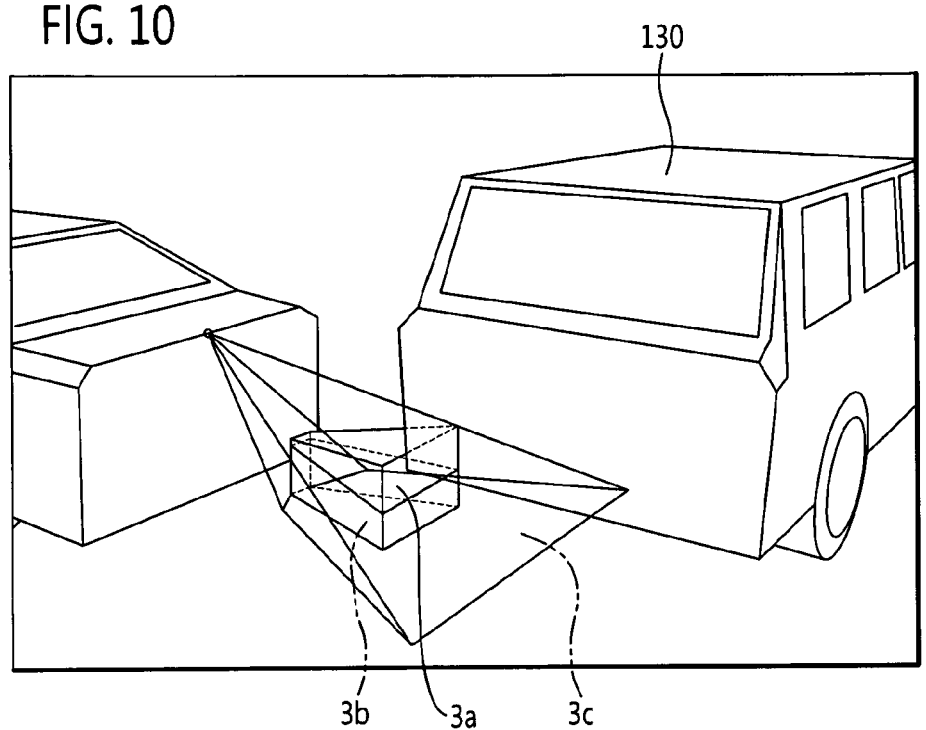
FIG. 10 is a perspective diagram showing an area where the obstacle detection range of the obstacle detection sensor is projected on a ground surface from a view point of the camera.

The image of the obstacle detection range 3a of the obstacle sensor 3 is, as shown in FIG. 10, an overlay image (referred to as obstacle detection range image hereinafter) indicating the area 3c of a range where the obstacle detection range 3a is projected on the ground surface with the attaching position of the camera 2 set as a view point when the obstacle detection range 3a is imaged by the camera 2.

Such a vehicle surrounding monitoring device directly displays the bird's-eye image 100 processed by the pixel synthesis unit 13 at a normal time when the obstacle determination unit 12 detects no obstacle, and synthesizes an obstacle detection range image with the bird's-eye image 100 to display it thereon when the obstacle determination unit 12 detects an obstacle. Accordingly, in the vehicle surrounding monitoring device, upon detection of the obstacle, if the obstacle is present above and thus not in contact with the ground surface, presence of the obstacle within the obstacle detection range 3a of the obstacle sensor 3 is recognized in the bird's-eye image 100 subjected to the view point conversion.

Figure 12:
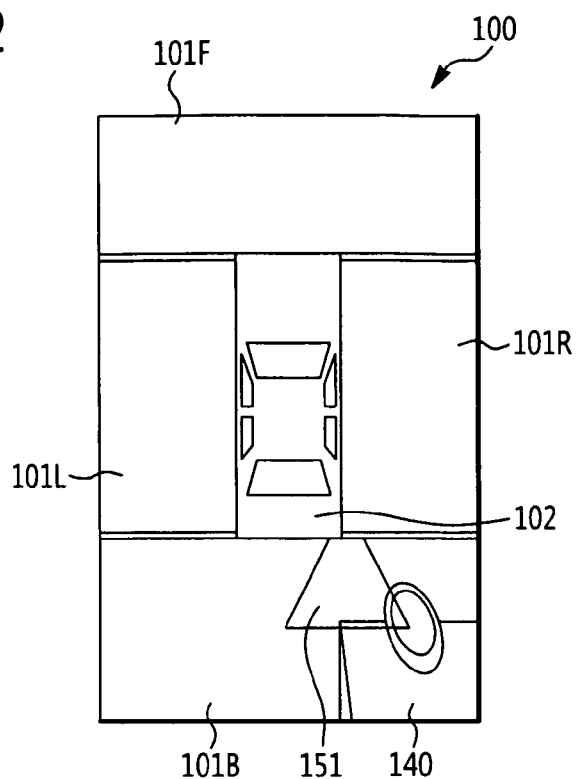
FIG. 12 is a diagram showing a bird's-eye image where the area having the obstacle detection range of the obstacle detection sensor being projected on the ground surface from a view point of the camera is synthesized as an obstacle detection range image by the vehicle surrounding monitoring device to which the present invention is applied.
Figure 13:
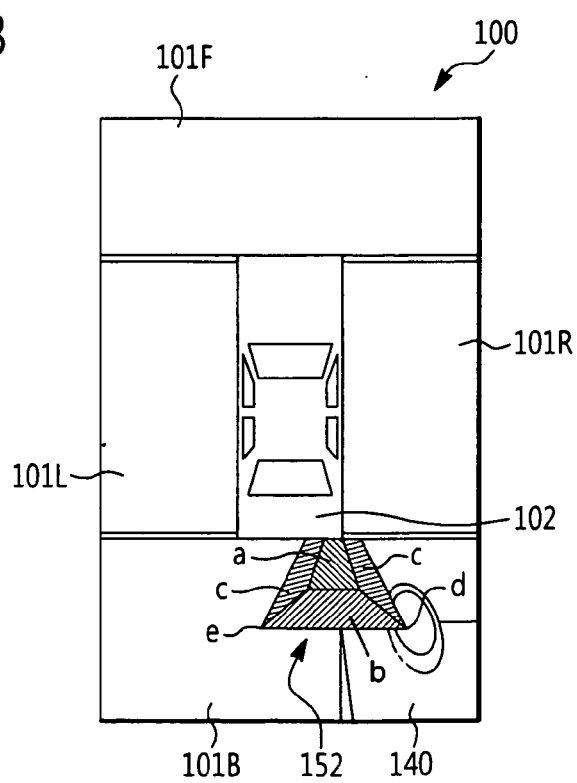
FIG. 13 is a diagram showing a bird's-eye image where the obstacle detection range is sterically synthesized by the vehicle surrounding monitoring device to which the present invention is applied.
Figure 14:
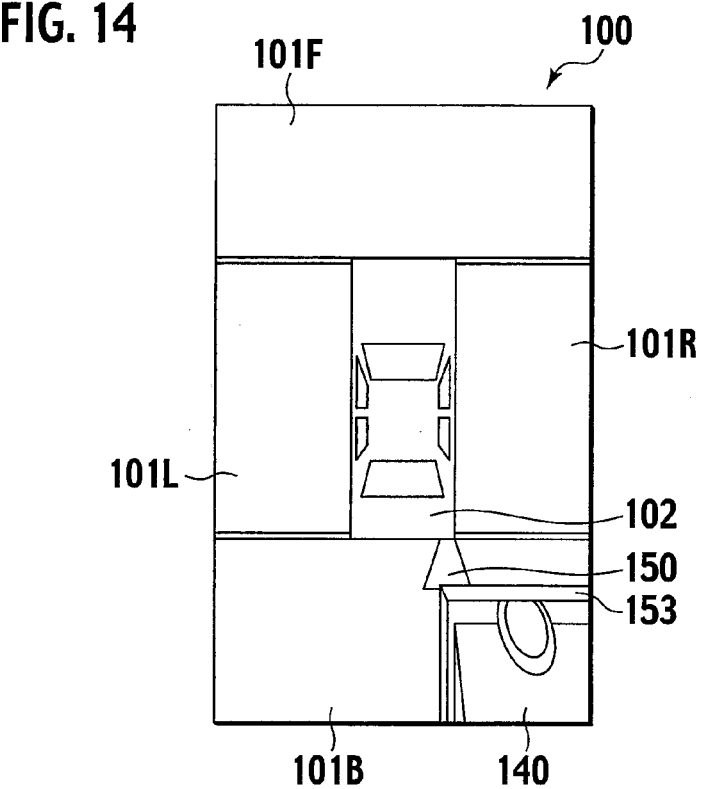
FIG. 14 is a diagram showing a bird's-eye image where an obstacle detection range image having the obstacle detection range projected on the ground surface is synthesized with a guide line indicating a projected position of the other vehicle on the ground surface by the vehicle surrounding monitoring device to which the present invention is applied.

Specifically, in the case of the positional relation between the own vehicle and the other vehicle 130 shown in FIGS. 9A and 9B, when the obstacle determination unit 12 detects presence of an obstacle in the rear right side of the own vehicle, the bird's-eye image 100 shown in FIGS. 11A and 11B is switched to displaying shown in any one of FIGS. 12 to 14. When the obstacle determination unit 12 detects no more obstacle, the displaying is returned to the bird's-eye image 100 of FIGS. 11A and 11B.

A bird's eye image 100 shown in FIG. 12 is an image obtained by displaying an other vehicle image 140 which is an obstacle detected in the rear right side of the own vehicle in the rear camera display area 101B, and synthesizing semi-transparently an obstacle detection range image 151 indicating an area 3c of a range passed from the installation position of the camera 2 through the end of the obstacle detection range 3a and projected on the ground surface with a predetermined area in the rear side of the own vehicle.

In the case of executing such displaying, the obstacle determination unit 12 notifies the detection of the obstacle in the rear right side of the own vehicle to the table switching unit 14. The table switching unit 14 selects an address conversion table to display the obstacle detection range image 151 in a rear side of the own vehicle overlay image 102. Accordingly, the pixel synthesis unit 13 can form a bird's-eye image 100 where not the camera image data but the obstacle detection range image 151 is displayed in the rear side of the own vehicle overlay image 102. Simultaneously, the obstacle determination unit 12 operates the warning output unit 17 to give a warning about presence of the other vehicle 130 within the obstacle detection range 3a.

A bird's-eye image 100 shown in FIG. 13 is an image obtained by synthesizing a steric obstacle detection range image 152 with the obstacle detection range 3a of the obstacle sensor 3BR which has detected the other vehicle 130. This obstacle detection range image 152 is configured by setting an area a (area 3b of FIG. 10) where the obstacle detection range 3a is projected on the ground surface seen from above as a bottom surface, and connecting planes b and c corresponding to the area 3c shown in FIG. 10 to the area a of the bottom surface. These planes b and c are planes extending vertically from a boundary of the area where the obstacle detection range 3a of the obstacle sensor 3 is projected on the ground surface with the attaching position of the camera 2 as a view point.

An end point d of the obstacle detection range image 152 is, as shown in FIG. 10, a point passed from the installation position of the camera 2 through one upper end part of the obstacle detection range 3a and projected on the ground surface. An end point e of the obstacle detection range image 152 is, as shown in FIG. 10, a point passed from the installation position of the camera 2 through the other upper end part of the obstacle detection range 3a and projected on the ground surface. In this case, the table switching unit 14 selects an address conversion table for displaying the steric obstacle detection range image 152 in the rear side of the own vehicle overlay image 102. Steric surfaces b and c of the steric obstacle detection range image 152 are preferably displayed by different colors to facilitate differentiation of the steric surfaces b and c from each other.

Thus, by displaying the steric obstacle detection range image 152 as the image of the obstacle detection range 3a, presence of the other vehicle 130 within the obstacle detection range 3a of the obstacle sensor 3 in its separated state from the ground surface can be presented.

Additionally, a bird's-eye image 100 shown in FIG. 14 is an image obtained by synthesizing a guide line 153 in a position where the other vehicle image 140 present away from and above the ground surface is projected on the ground surface with the obstacle detection range image 150 of the area (area 3b of FIG. 10) where the obstacle detection range 3a is projected on the ground surface. The guide line 153 is a line where a car body part and a bumper part as ends of the other vehicle 130 are projected on the ground surface, and displayed in contact with the obstacle detection range image 150.

In this case, the table switching unit 14 selects an address conversion table for displaying the obstacle detection range image 150 in the rear side of the own vehicle overlay image 102. The pixel synthesis unit 13 forms a bird's-eye image 100 by synthesizing the guide line 153 with a position of a distance calculated by the obstacle determination unit 12 where a part of the other vehicle 130 away from the ground surface is present. The pixel synthesis unit 13 prestores distance coordinates from the obstacle sensor 3 in the bird's-eye image 100, and synthesizes the guide line 153 with the position of the distance to the other vehicle 130 calculated by the obstacle determination unit 12 in the bird's-eye image 100. Accordingly, the guide line 153 is displayed in a form where the other vehicle image 140 is projected on the ground surface.

Thus, the guide line 153 is synthesized with the bird's-eye image 100 in a form of being stacked on the obstacle detection range image 150, whereby the presence of the other vehicle 130 within the obstacle detection range 3a can be presented to the driver.

Figure 15:
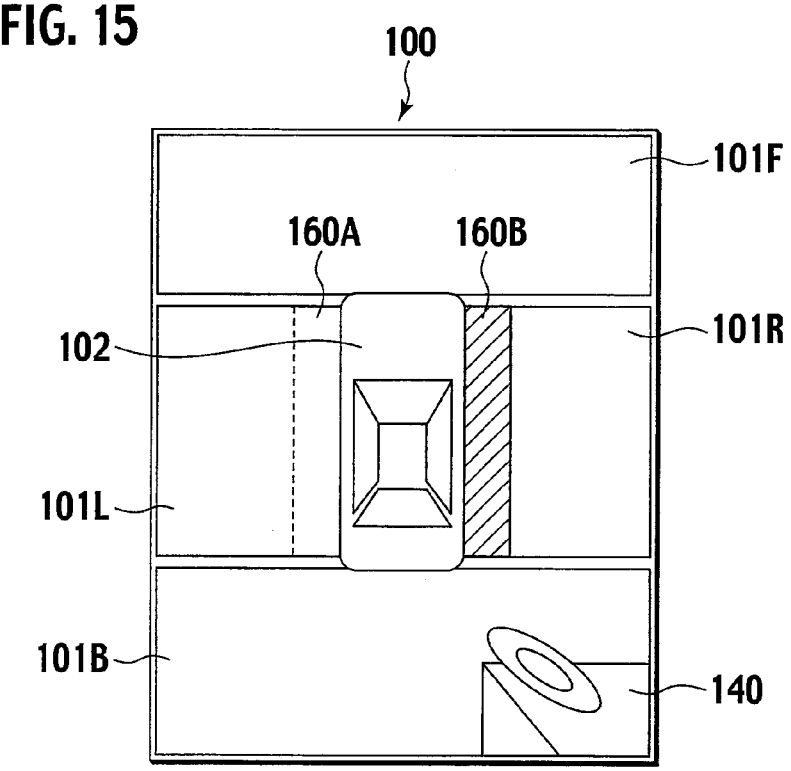
FIG. 15 is another diagram showing a bird's-eye image where an overlay image is synthesized to make a driver understand positional shifting of the obstacle.
Figure 16:
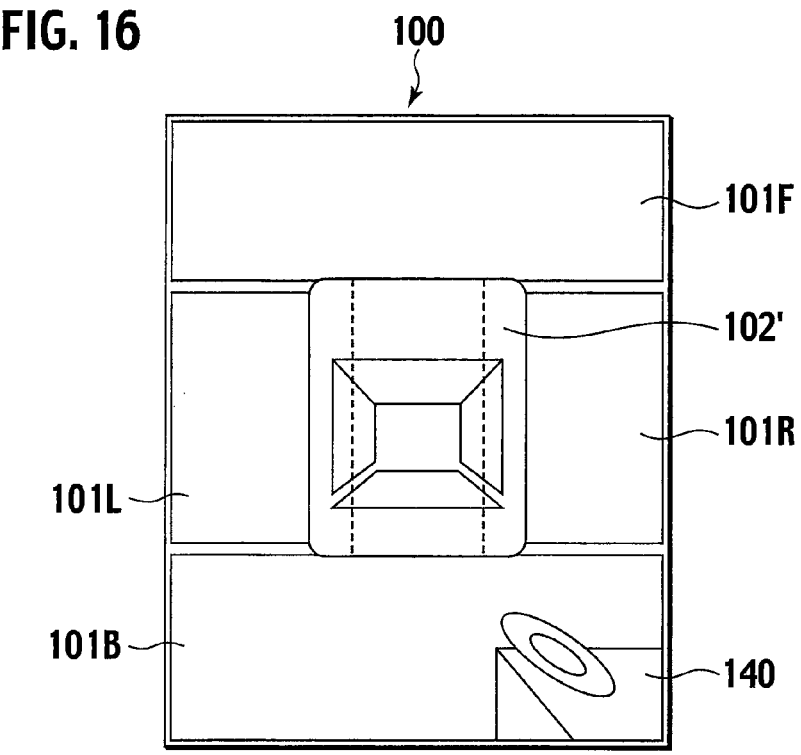
FIG. 16 is another diagram showing a bird's-eye image where an overlay image is synthesized to make a driver understand positional shifting of the obstacle.
Figure 17:
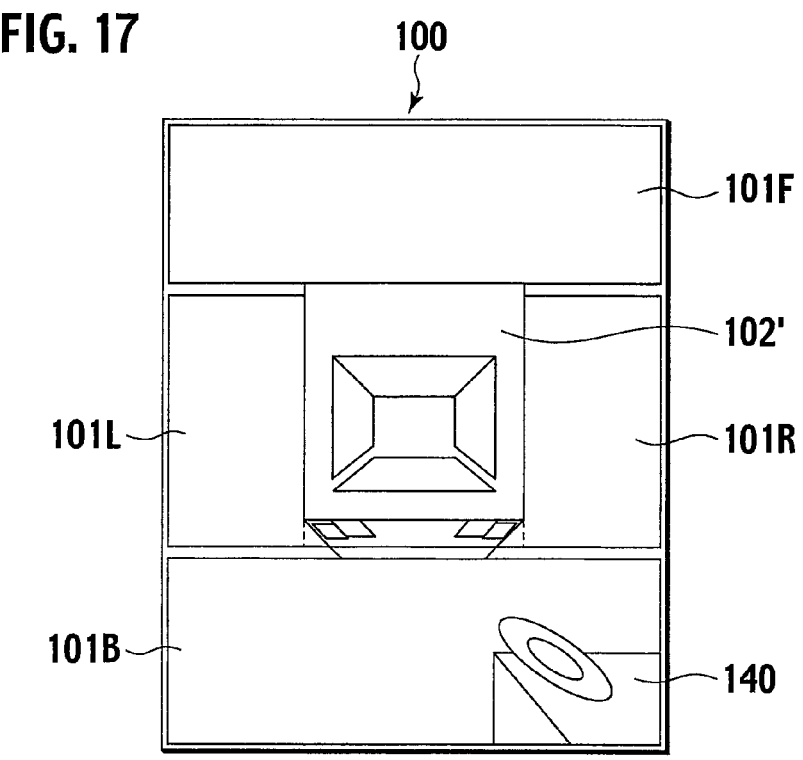
FIG. 17 is another diagram showing a bird's-eye image where an overlay image is synthesized to make a driver understand positional shifting of the obstacle.

Furthermore, as another method for enabling understanding of shifting of a positional relation between the own vehicle overlay image 102 and the other vehicle image 140 in the bird's-eye image 100 from an actual positional relation between the own vehicle and the other vehicle 130, as shown in FIGS. 15 to 17, the display form of the own vehicle overlay image 102 drawn roughly in the center of the bird's-eye image 100 may be changed.

In a bird's-eye image 100 shown in FIG. 15, the other vehicle image 140 is displayed in a rear right side, overlay images 160A and 160B are formed in left and right sides of the own vehicle overlay image 102, and the overlay image 160B in a direction where the other vehicle image 140 is present is displayed by a warning color. The table switching unit 14 selects an address conversion table for displaying respectively the semitransparent overlay image 160A and the warning color overlay image 160B on both sides of the own vehicle overlay image 102. Accordingly, an area of the own vehicle overlay image 102 is set larger than a floor area of the own vehicle.

In a bird's-eye image 100 shown in FIG. 16, the own vehicle overlay image 102 is changed to a virtual own vehicle overlay image 102' enlarged in a horizontal direction. In this case, the table switching unit 14 selects an address conversion table for displaying an own vehicle overlay image 102' where a width of the own vehicle overlay image 102 is increased.

Furthermore, as shown in FIG. 17, the own vehicle overlay image 102 is enlarged horizontally and sterically to be changed to a virtual own vehicle overlay image 102'. In this case, the table switching unit 14 selects an address conversion table for increasing a width of the own vehicle overlay image 102, and displaying the steric own vehicle overlay image 102'.

Thus, when the obstacle is detected, by enlarging the own vehicle overlay image 102 of the size corresponding to the floor area of the own vehicle in the width direction, a positional relation between the own vehicle and the other vehicle image 140 which are brought into contact with each other when the own vehicle is moved back straight can be understood by the driver.

As shown in FIGS. 15 to 17, when the own vehicle overlay image 102 is enlarged to be displayed, by the warning output unit 17, the presence of the other vehicle 130 within the obstacle detection range 3a may be understood by a warning sound. Accordingly, in reality, there is a possibility of contact between the obstacle detected by the obstacle sensor 3 and the own vehicle, and this possibility can be surely presented to the driver.

The aforementioned embodiment is only an example of the present invention. The invention is not limited to the embodiment. Needless to say, even other embodiments can be employed, and various changes can be made according to design or the like without departing from the technical ideas of the invention.

In other words, in the aforementioned display example of the bird's-eye image 100, the obstacle detection range image is displayed in the semitransparent manner. Not limited to this, however, the obstacle detection range image may be flashed.

INDUSTRIAL APPLICABILITY

According to the present invention, when an obstacle is detected, a warning is given, and images are synthesized so that an image of the obstacle is brought into contact with the obstacle detection range. Thus, even when the obstacle is present away from the ground surface, and even when positional shifting of the obstacle occurs in a view point converted image, displaying can be realized where no uncomfortable feelings are given in a positional relation between the obstacle detection range and the obstacle.

The invention claimed is:

1. A vehicle surrounding monitoring device, comprising:
   at least one camera installed in an own vehicle to obtain an image around an own vehicle;
   an obstacle detection device installed in the own vehicle configured to detect an obstacle in an obstacle detection range;
   an image processing device configured to convert a camera image imaged by the camera into a view point converted image seen from a virtual view point above the own vehicle; and
   a display configured to display the view point converted image of the image processing device, the view point converted image being synthesized with an image of the obstacle detection range of the obstacle detection device,
   wherein, simultaneously when a warning is given upon entry of an obstacle within the obstacle detection range of the obstacle detection device, the image processing device modifies at least one of the image of the obstacle detection range of the obstacle detection device and an obstacle image imaged by the camera and included in the view point converted image so that the image of the obstacle detection range of the obstacle detection device and the obstacle image substantially contact one another,
   wherein the image processing device is configured to set the image obtained by projecting the obstacle detection range of the obstacle detection device on a ground surface, with an attaching position of the camera set as a view point, as the image of the obstacle detection range, and is configured to modify the image of the obstacle detection range projected on the ground surface with the view point converted image seen from the virtual view point above the own vehicle.

2. The vehicle surrounding monitoring device according to claim 1, wherein the image processing device sterically modifies the image of the obstacle detection range of the obstacle detection device with the view point converted image.

3. The vehicle surrounding monitoring device according to claim 2, wherein the image of the obstacle detection range comprises a stereoscopic image that includes an image of an area where the obstacle detection range is projected on a ground surface, and a plane extending vertically from a boundary of an area where the obstacle detection range of the obstacle detection device is projected on the ground surface with an attaching position of the camera set as a view point, and is modified as the view point converted image to be displayed.

4. A vehicle surrounding monitoring device, comprising:
   at least one camera installed in an own vehicle to obtain an image around an own vehicle;
   an obstacle detection device installed in the own vehicle configured to detect an obstacle in an obstacle detection range;
   an image processing device configured to convert a camera image imaged by the camera into a view point converted image seen from a virtual view point above the own vehicle; and
   a display configured to display the view point converted image of the image processing device, the view point converted image being synthesized with an image of the obstacle detection range of the obstacle detection device,
   wherein, simultaneously when a warning is given upon entry of an obstacle within the obstacle detection range of the obstacle detection device, the image processing device modifies at least one of the image of the obstacle detection range of the obstacle detection device and an obstacle image imaged by the camera and included in the view point converted image so that the image of the obstacle detection range of the obstacle detection device and the obstacle image substantially contact one another, wherein the obstacle detection device is configured to detect an obstacle in space away from a ground surface; and wherein an image of an area where the obstacle detection range is projected on the ground surface, and an image displayed in a position where the obstacle detected by the obstacle detection device is projected on the ground surface and brought into contact with the image of the area where the obstacle detection range is projected on the ground surface are modified as the view point converted image to be displayed, wherein the image processing device is configured to set the image obtained by projecting the obstacle detection range of the obstacle detection device on a ground surface, with an attaching position of the camera set as a view point, as the image of the obstacle detection range, and is configured to modify the image of the obstacle detection range projected on the ground surface with the view point converted image seen from the virtual view point above the own vehicle.

5. The vehicle surrounding monitoring device according to claim 1, wherein the image processing device is configured to display the image of the obstacle detection range in a semi-transparent manner.

6. A vehicle surrounding monitoring method, comprising:
obtaining an image around an own vehicle by at least one camera installed in the own vehicle;
detecting an obstacle in an obstacle detection range by an obstacle detection sensor;
converting the image obtained by the at least one camera into a view point converted image seen from a virtual view point above the own vehicle;
displaying the view point converted image synthesized with an image of the obstacle detection range of the obstacle detection sensor;
when presence of an obstacle is detected by the obstacle detection sensor, giving a warning, and simultaneously modifying at least one of the image of the obstacle detection range of the obstacle detection sensor and an obstacle image included in the view point converted image so that the image of the obstacle detection range of the obstacle detection sensor and the obstacle image substantially contact one another, setting an image obtained by projecting the obstacle detection range of the obstacle detection sensor on a ground surface, with an attaching position of the camera set as a view point, as the image of the obstacle detection range, and modifying the image of the obstacle detection range projected on the ground surface with the view point converted image seen from the virtual view point above the own vehicle.

7. The vehicle surrounding monitoring device according to claim 1, wherein the warning is provided by a sound.

8. A vehicle surrounding monitoring device, comprising:
at least one camera installed in an own vehicle to obtain an image around the own vehicle;
obstacle detection means installed in the own vehicle for detecting an obstacle in an obstacle detection range;
image processing means for converting a camera image imaged by the camera into a view point converted image seen from a virtual view point above the own vehicle; and
display means for displaying the view point converted image of the image processing means, the view point converted image being synthesized with an image of the obstacle detection range of the obstacle detection means, wherein, simultaneously when a warning is given upon entry of an obstacle within the obstacle detection range of the obstacle detection means, the image processing means modifies at least one of the image of the obstacle detection range of the obstacle detection means and an obstacle image imaged by the camera and included in the view point converted image so that the image of the obstacle detection range of the obstacle detection means and the obstacle image contact one another, wherein the image processing means is for setting an image obtained by projecting the obstacle detection range of the obstacle detection means on a ground surface, with an attaching position of the camera set as a view point, as the image of the obstacle detection range, and is for modifying the image of the obstacle detection range projected on the ground surface with the view point converted image seen from the virtual view point above the own vehicle.

9. A non-transitory computer readable medium having program code recorded therein, that, when executed on a computing system, causes the computing system to perform steps comprising:
obtaining an image around an own vehicle by at least one camera installed in the own vehicle;
detecting an obstacle in an obstacle detection range by an obstacle detection sensor;
converting the image obtained by the at least one camera into a view point converted image seen from a virtual view point above the own vehicle;
displaying the view point converted image synthesized with an image of the obstacle detection range of the obstacle detection sensor;
when presence of an obstacle is detected by the obstacle detection sensor, giving a warning, and simultaneously modifying at least one of the image of the obstacle detection range of the obstacle detection sensor and an obstacle image included in the view point converted image so that the image of the obstacle detection range of the obstacle detection sensor and the obstacle image substantially contact one another, setting an image obtained by projecting the obstacle detection range of the obstacle detection sensor on a ground surface, with an attaching position of the camera set as a view point, as the image of the obstacle detection range, and modifying the image of the obstacle detection range projected on the ground surface with the view point converted image seen from the virtual view point above the own vehicle.

10. A vehicle surrounding monitoring device, comprising:
at least one camera installed in an own vehicle to obtain an image around an own vehicle;
an obstacle detection device installed in the own vehicle configured to detect an obstacle in an obstacle detection range;
an image processing device configured to convert a camera image imaged by the camera into a view point converted image seen from a virtual view point above the own vehicle; and
a display configured to display the view point converted image of the image processing device, the view point converted image being synthesized with an image of the obstacle detection range of the obstacle detection device, wherein, simultaneously when a warning is given upon entry of an obstacle within the obstacle detection range of the obstacle detection device, the image processing device modifies at least one of the image of the obstacle detection range of the obstacle detection device and an obstacle image imaged by the camera and included in the view point converted image so that the image of the obstacle detection range of the obstacle detection device and the obstacle image substantially contact one another, wherein the display directly displays the view point converted image at a normal time when the obstacle detection device detects no obstacle, and displays the image of the obstacle detection range synthesized with the view point converted image when the obstacle detection device detects the obstacle, wherein the image processing device is configured to set the image obtained by projecting the obstacle detection range of the obstacle detection device on a ground surface, with an attaching position of the camera set as a view point, as the image of the obstacle detection range, and is configured to modify the image of the obstacle detection range projected on the around surface with the view point converted image seen from the virtual view point above the own vehicle.

* * * * *